US 6,620,039 B1

(12) United States Patent
Tao et al.

(10) Patent No.: US 6,620,039 B1
(45) Date of Patent: Sep. 16, 2003

(54) METHOD AND APPARATUS FOR PROVIDING FRESH AIR TO A TRUCK SLEEPER BOX

(75) Inventors: Michikazu Jody Tao, Maple Valley, WA (US); Steven L. Baker, Duvall, WA (US); John Sheldon, Kirkland, WA (US)

(73) Assignee: Paccar Inc., Bellevue, WA (US)

( * ) Notice: Subject to any disclaimer, the term of this patent is extended or adjusted under 35 U.S.C. 154(b) by 0 days.

(21) Appl. No.: 10/159,966

(22) Filed: May 30, 2002

(51) Int. Cl.⁷ ............................... B60H 1/26; B60H 1/32
(52) U.S. Cl. ..................... 454/139; 454/156; 454/158
(58) Field of Search ........................... 454/78, 82, 87, 454/139, 158, 156, 159, 99

(56) References Cited

U.S. PATENT DOCUMENTS

| | | | |
|---|---|---|---|
| 2,185,486 A | * | 1/1940 | Wahlberg .................... 454/139 |
| 3,057,171 A | * | 10/1962 | Hulse et al. ................. 62/239 |
| 3,180,244 A | * | 4/1965 | Mescher ...................... 454/157 |
| 4,120,527 A | | 10/1978 | Lawrence |
| 4,412,425 A | | 11/1983 | Fukami et al. |
| 4,989,500 A | | 2/1991 | Anliker et al. |
| 5,273,487 A | | 12/1993 | Dauvergne |
| 5,333,678 A | | 8/1994 | Mellum et al. |
| 5,619,862 A | | 4/1997 | Ruger et al. |
| 5,901,572 A | | 5/1999 | Peiffer et al. |
| 5,901,780 A | | 5/1999 | Zeigler et al. |
| 5,911,624 A | | 6/1999 | Stauffer |
| 6,196,308 B1 | | 3/2001 | Halligan |
| 6,361,428 B1 | * | 3/2002 | Tosconi et al. ............. 454/137 |
| 2002/0025772 A1 | * | 2/2002 | Egami et al. ............... 454/121 |

* cited by examiner

Primary Examiner—Harold Joyce
(74) Attorney, Agent, or Firm—Christensen O'Connor Johnson Kindness PLLC

(57) ABSTRACT

An air intake plenum (88) of a truck sleeper box (18) is disclosed. The plenum (88) is in fluid communication with an aperture (98) that penetrates through a peripheral wall (58) of the sleeper box (18), thereby providing fresh air (46) to the plenum (88). The plenum includes an enclosure (86) and a fresh air inlet (70) that is in fluid communication with an interior of the enclosure (86) and the aperture (98). The plenum also includes a recirculated air inlet (68) in fluid communication with the interior of the enclosure (86) and the air contained within the sleeper box (18). The plenum further includes an air outlet (52) in fluid communication with the inlets (68 and 70). The air outlet (52) is adaptable to be in fluid communication with a heating, ventilation, and air conditioning system. Additionally, a method for providing fresh air to a sleeper box is disclosed.

11 Claims, 4 Drawing Sheets

METHOD AND APPARATUS FOR PROVIDING FRESH AIR TO A TRUCK SLEEPER BOX

FIELD OF THE INVENTION

The present invention relates generally to air treatment systems for motor vehicles and, more particularly, to air treatment systems for motor vehicles having both a cab compartment and a sleeper box.

BACKGROUND OF THE INVENTION

Heavy-duty commercial trucks, such as Class 8 trucks and, in particular, tractor-trailer type trucks, transport much of the nation's products and goods over the interstate highway system and are similarly used throughout the world. In long-haul applications, truckers may carry a load thousands of miles across the country to deliver the goods to their intended destination. Many such long-haul trucks are provided with a sleeper compartment, or sleeper box, directly behind the tractor cab. The sleeper box provides a comfortable "room" wherein the truck driver can relax and/or sleep, either during scheduled rest breaks with the truck parked, or while another trucker is driving the vehicle. It is common for two-person trucker teams to drive a long-haul route cooperatively, with one trucker resting in the sleeper box while the second trucker is driving, and vice versa.

In order for the non-driving trucker to get adequate rest and, in particular, to get suitably restful sleep during an off period, it is clearly important that the sleeper compartment be comfortable. To provide a comfortable environment, the sleeper box is typically provided with a bed and a heavy, sound-dampening curtain between the sleeper box and the cab. Additionally, an independently controllable air treatment system having heating and/or cooling systems is frequently provided within the sleeper box whereby the occupant of the sleeper box can maintain a comfortable temperature for sleeping, independent of the cab temperature. Prior art air treatment systems typically include a hot water driven heating heat exchanger, an air conditioning system driven cooling heat exchanger, and a blower for circulating air over the heat exchangers.

Although these prior art systems permit the temperature of the sleeper box to be independently controlled, the sleeper box air treatment systems are not independently provided with fresh air. Therefore, the air treatment system of the sleeper box is forced to treat the same ambient air contained within the cab of the truck, without the benefit of the inclusion of fresh air. In particular, the only source of fresh air to the tractor cab and sleeper box is through the vents and windows in the tractor cab and/or sleeper box and from the cab air treatment system, which is independently supplied with fresh air. The sleeper box can therefore become stuffy if the curtain separating the cab from the sleeper box is kept completely closed, since the sleeper box air treatment system is not independently provided with fresh air. The non-driving trucker may then be faced with a choice of partially opening the curtain to obtain an adequate supply of fresh air originating from the cab, and having to tolerate the additional noise from the cab, or closing the curtain completely and tolerating the wind noise and untreated air obtained from the sleeper box side vents. Moreover, in situations where the on-shift driver smokes, the off-shift driver may have a particularly difficult time obtaining adequate fresh air to the sleeper box, even if the curtain is left partially open.

There is a need, therefore, for a sleeper box air treatment system that can provide adequate fresh air to the sleeper box of a truck, independent of the cab portion of the truck, while also allowing the curtain between the cab and the sleeper box to be left substantially closed.

SUMMARY OF THE INVENTION

In accordance with the present invention, an air intake plenum, operable to couple in fluid communication with a heating, ventilation, and air conditioning system of a sleeper box, is provided. The plenum is operable to be in fluid communication with an aperture that penetrates through a peripheral wall of the sleeper box. The air intake plenum includes an enclosure and a fresh air inlet. The fresh air inlet is in fluid communication with an interior of the enclosure and adaptable to couple to an aperture in a peripheral wall of a sleeper box, thereby placing the enclosure in fluid communication with fresh air from outside of the sleeper box. The air intake plenum further includes a recirculated air inlet in fluid communication with the interior of the enclosure and adaptable to be in fluid communication with air contained within the sleeper box. The air intake plenum also includes an air outlet in fluid communication with the fresh air inlet and the recirculated air inlet, wherein the air outlet is adaptable to be in fluid communication with a heating, ventilation, and air conditioning system.

In accordance with further aspects of the invention, the air intake plenum may include a proportioner operable to adjust the ratio of fresh air relative to recirculated air received from the fresh air inlet and the recirculated air inlet by the air outlet, when the air outlet is coupled to the heating, ventilation, and air conditioning system.

In accordance with still further aspects of the invention, the air intake plenum may include an air filter or combination filter, for example a particle and carbon filter, disposed in the enclosure downstream of the fresh air inlet and the recirculated air inlet. In accordance with still further aspects of the invention, the air intake plenum may include at least one drain aperture penetrating a bottom wall of the enclosure. In accordance with other aspects of the invention, the air intake plenum may include ducting operable to couple in fluid communication the fresh air inlet to the aperture in the peripheral wall of the sleeper box when the fresh air inlet is spaced from the aperture.

In accordance with still other aspects of the invention, a method for providing intake air to a heating, ventilation, and air conditioning system of a sleeper box having an aperture in a peripheral wall of the sleeper box is provided. The method includes the steps of obtaining an amount of fresh air through the aperture in the peripheral wall of a sleeper box and delivering the fresh air into an enclosure. The method further includes obtaining an amount of recirculated air from within the sleeper box and delivering the air into the enclosure and proportioning the amount of fresh air obtained relative to the amount of recirculated air obtained. The method still further includes providing a proportioned amount of fresh air and recirculated air to an air outlet adaptable to be coupled in fluid communication with a heating, ventilation, and air conditioning system.

In accordance with still other yet aspects of the present invention, an air treatment system of a sleeper box having an aperture in a peripheral wall of the sleeper box is provided. The air treatment system includes an enclosure, a blower, a heat exchanger, a conditioned air outlet in fluid communication with an interior of the enclosure, and a fresh air inlet in fluid communication with the interior of the enclosure and adaptable to couple in fluid communication with the aperture in the peripheral wall of the sleeper box. The blower of the air treatment system is coupled in fluid flow communication with the fresh air inlet, the conditioned air outlet, and the heat exchanger and operable to flow fresh air obtained from the fresh air inlet through the heat exchanger and out the conditioned air outlet.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
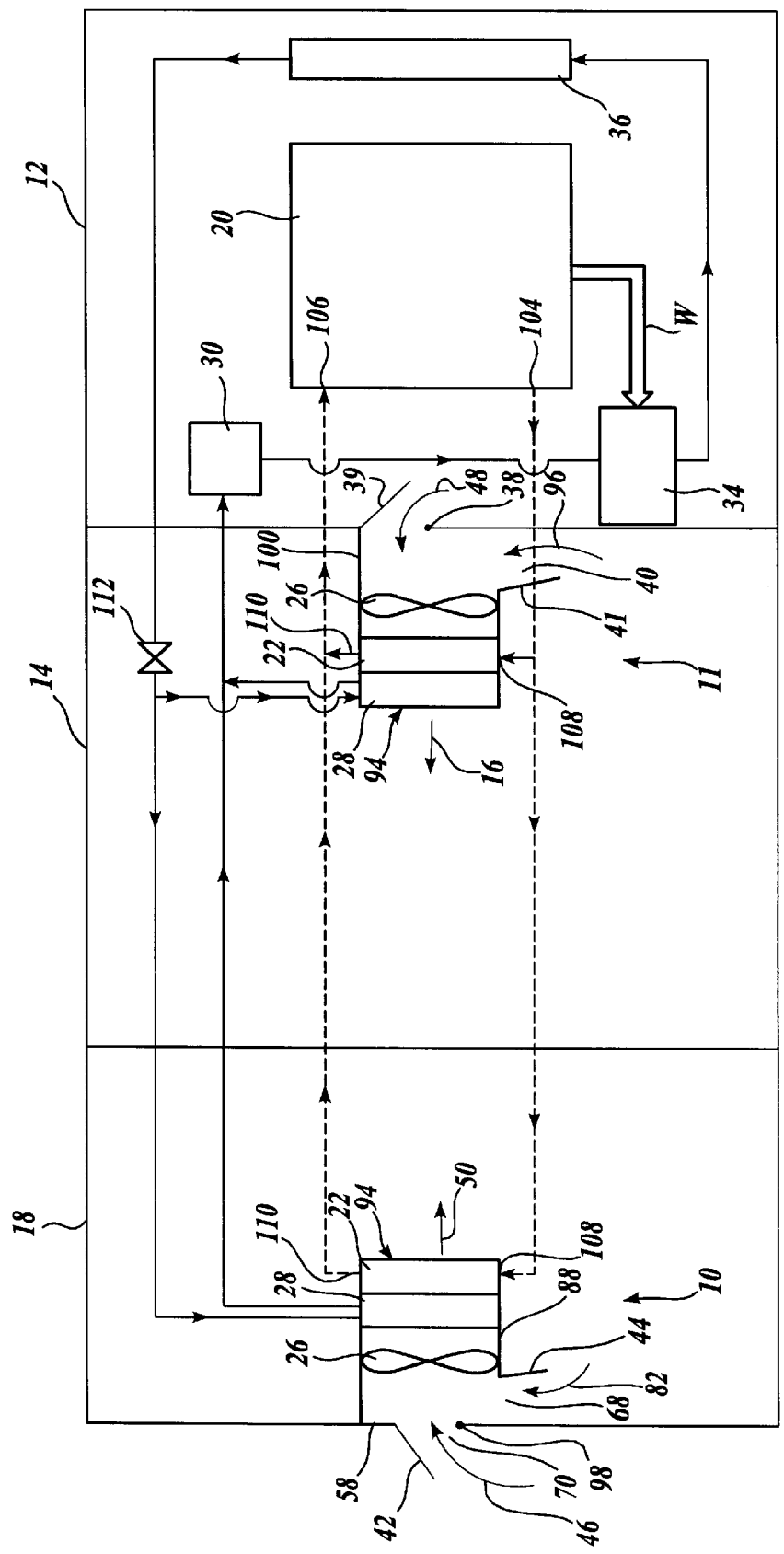
FIG. 1 is a schematic view of a sleeper box air treatment system formed in accordance with the present invention, shown in fluid communication with the HVAC systems of a motor vehicle.

FIG. 1 illustrates in schematic the Heating, Ventilation, and Air Conditioning (hereinafter "HVAC") systems of a truck coupled in fluid communication with one embodiment of a sleeper box air treatment system 10 formed in accordance with the present invention. The sleeper box air treatment system 10 may be used to treat the interior air of a sleeper box 18 of a heavy duty commercial truck, such as a Class 8 truck and, in particular, a tractor-trailer type truck. A truck of this type is typically divided into three compartments: an engine compartment 12, a cab 14, and the sleeper box 18. The engine compartment 12 houses an engine 20, a condenser 36, a compressor 34, and an accumulator/dehydrator 30. The cab compartment contains the driver's seat and controls and further includes a cab air treatment system 11. The sleeper box 18 contains a bed and/or other such amenities and the sleeper box air treatment system 10.

The sleeper box air treatment system 10 includes an air intake plenum 88 coupled to a HVAC unit 94. The HVAC unit 94 may include a fan or blower 26, a heating heat exchanger 22, and a cooling heat exchanger 28. Although the illustrated embodiment depicts both a heating and a cooling heat exchanger, it should be apparent to one skilled in the art that the HVAC unit 94 may provide solely heating or solely cooling functions, or may include other air treatment components in lieu of or in addition to the heat exchangers 22 and 28, such as electrical resistance heating coils or filtration devices.

The air intake plenum 88 includes a fresh air inlet 70 coupled in fluid communication with an aperture 98 located in the peripheral wall 58 of the sleeper box 18, and a recirculated air inlet 68 coupled in fluid communication with the air contained within the sleeper box 18. The blower 26 flows fresh air 46 and recirculated air 82 over the heating and cooling heat exchangers 22 and 28, thereby providing treated air 50 into the sleeper box 18. Configured as described, the sleeper box air treatment system 10 can provide treated air 50, which may selectively include a mixture of fresh air obtained directly from outside of the sleeper box 18, of the proper temperature to provide a comfortable environment for the occupant of the sleeper box 18.

The air intake plenum 88 further includes a recirculated air inlet door 44. The recirculated air inlet door 44 may be actuated to adjust the flow rate of recirculated air taken into the air intake plenum 88, as should be apparent to one skilled in the art. The air intake plenum 88 also includes a fresh air inlet door 42. Similarly, the fresh air inlet door 42 may be actuated to adjust the flow rate of fresh air 46 taken into the air intake plenum 88.

The cab air treatment system 11 is of similar construction to the sleeper box air treatment system 10. The cab air treatment system 11 includes an air intake plenum 100 coupled to a HVAC unit 94. The HVAC unit 94 may include a fan or blower 26, a heating beat exchanger 22, and a cooling heat exchanger 28. Although the illustrated embodiment depicts both a heating and cooling heat exchangers 22 and 28, it should be apparent to one skilled in the art that the HVAC unit 94 may provide solely heating or solely cooling functions, or may include other air treatment components in lieu of or in addition to the heat exchangers 22 and 28, such as electrical resistance heating coils or filtration devices.

The air intake plenum 100 includes a fresh air inlet 38 coupled in fluid communication with fresh air 48 located outside of the truck, and a recirculated air inlet 40 coupled in fluid communication with the air contained within the cab 14. The blower 26 flows fresh air 48 and recirculated air 96 over the heating and cooling heat exchangers 22 and 28, thereby providing treated air 16 into the cab 14. Configured as described, the cab air treatment system 11 can provide treated air 16 into the cab 14 of the proper temperature to provide a comfortable environment for the driver.

The air intake plenum 100 further includes a recirculated air inlet door 41. The recirculated air inlet door 41 may be actuated to adjust the flow rate of recirculated air 96 taken into the air intake plenum 100, as should be apparent to one skilled in the art. The air intake plenum 100 also includes a fresh air inlet door 39. Similarly, the fresh air inlet door 39 may be actuated to adjust the flow rate of fresh air 48 taken into the air intake plenum 100.

The engine compartment 12 houses the systems necessary to provide heated and cooled liquids to the heating and cooling heat exchangers 22 and 28, respectively. The heated fluid for use in the heating beat exchangers 22 is provided by the engine cooling system. As is well known, engine-cooling systems remove the heat of combustion by passing a liquid through passages formed in the block of the engine 20. As the liquid flows through the engine 20, the temperature of the liquid increases as the liquid absorbs heat released during the combustion process. This heated liquid is piped out of an outlet 104 located on the engine 20. The outlet 104 is in fluid communication with an inlet 108 located on each heating heat exchanger 22. The heated liquid flows through coils contained within the heating heat exchangers 22. As the heated liquid passes through the coils of the heating heat exchangers 22, heat is transferred from the heated liquid to the air flowing through the heating heat exchangers 22. The now cooled heating liquid exits the heating heat exchangers 22 through an outlet port 110 and is directed back to the engine 20 cooling system through an inlet 106 on the engine 20.

The cooling heat exchangers 28 are coupled to a well-known air conditioning system. The air conditioning system includes the compressor 34, the condenser 36, the cooling heat exchangers 28, and the accumulator/dehydrator 30. The air conditioning system removes heat from the cab 14 interior to maintain a comfortable occupant environment. The system is closed and operates under pressure. The air conditioning system has a low-pressure (suction) side and a high-pressure (discharge) side. The high-pressure side of the system contains all components from a discharge port of the compressor 34 to an expansion valve 112. The low-pressure side contains all the components located from the expansion valve 112 to an inlet port of the compressor 34.

The operation of the air conditioning system will now be described. Work W provided by the engine is used to drive the compressor 34, thereby compressing the gaseous refrigerant into a high-temperature, high-pressure gas. The high-temperature, high-pressure gas is piped to the condenser 36. Air of a relatively cool temperature is passed through the coils of the condenser 36, cooling the high-temperature, high-pressure gas. As the refrigerant is cooled, latent heat is removed from the gas, condensing the gas into a cool, high-pressure liquid. The cool, high-pressure liquid is then piped to the expansion valve 112.

As refrigerant flows through the expansion valve 112, the refrigerant expands and the pressure and temperature of the refrigerant drops. The cool, low-pressure refrigerant is then directed to the cooling heat exchangers 28. As described above, air is forced across the cooling heat exchangers 28 by the blowers 26, thereby providing cool treated air into the cab 14 and sleeper box 18, providing occupant comfort. The low pressure and absorbed heat cause the refrigerant to evaporate. The low-pressure gas returns to the compressor 34 via the accumulator/dehydrator 30, and the cycle is repeated.

Figure 2:
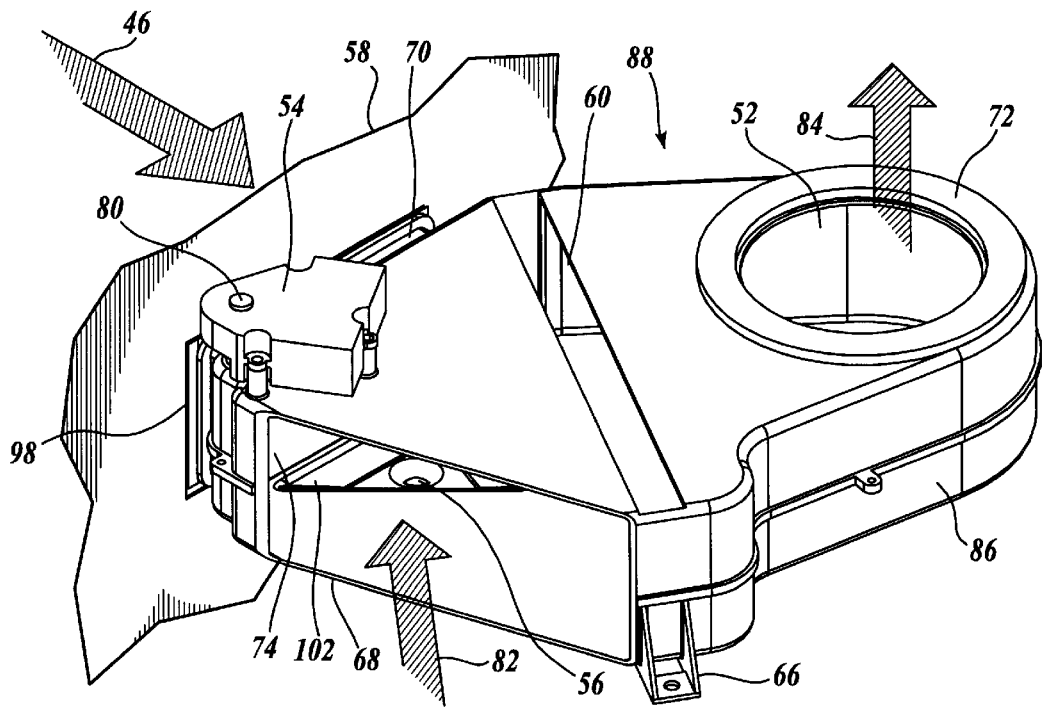
FIG. 2 is a perspective view of a fresh air intake plenum of a sleeper box air treatment system, formed in accordance with one embodiment of the present invention.
Figure 3:
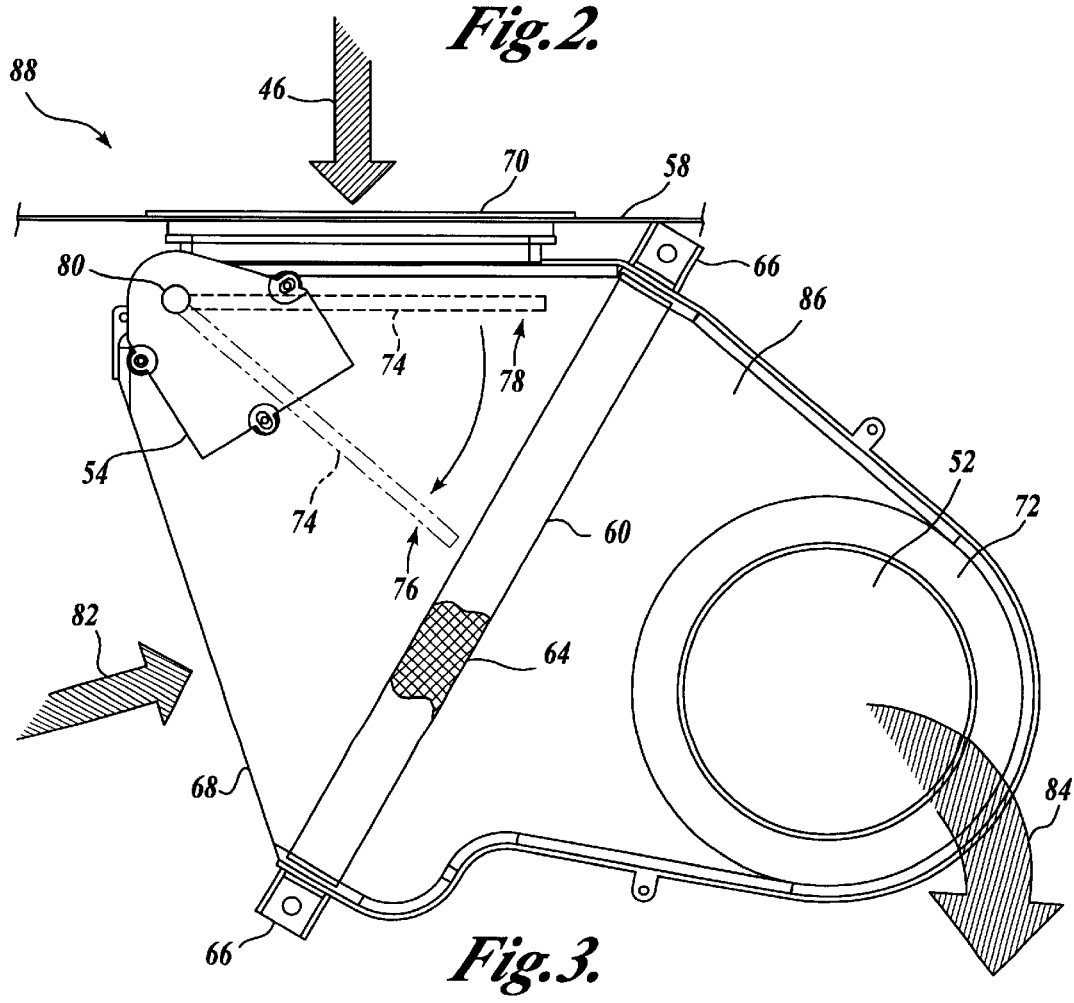
FIG. 3 is a plan view of the fresh air intake plenum shown in FIG. 2.
Figure 6:
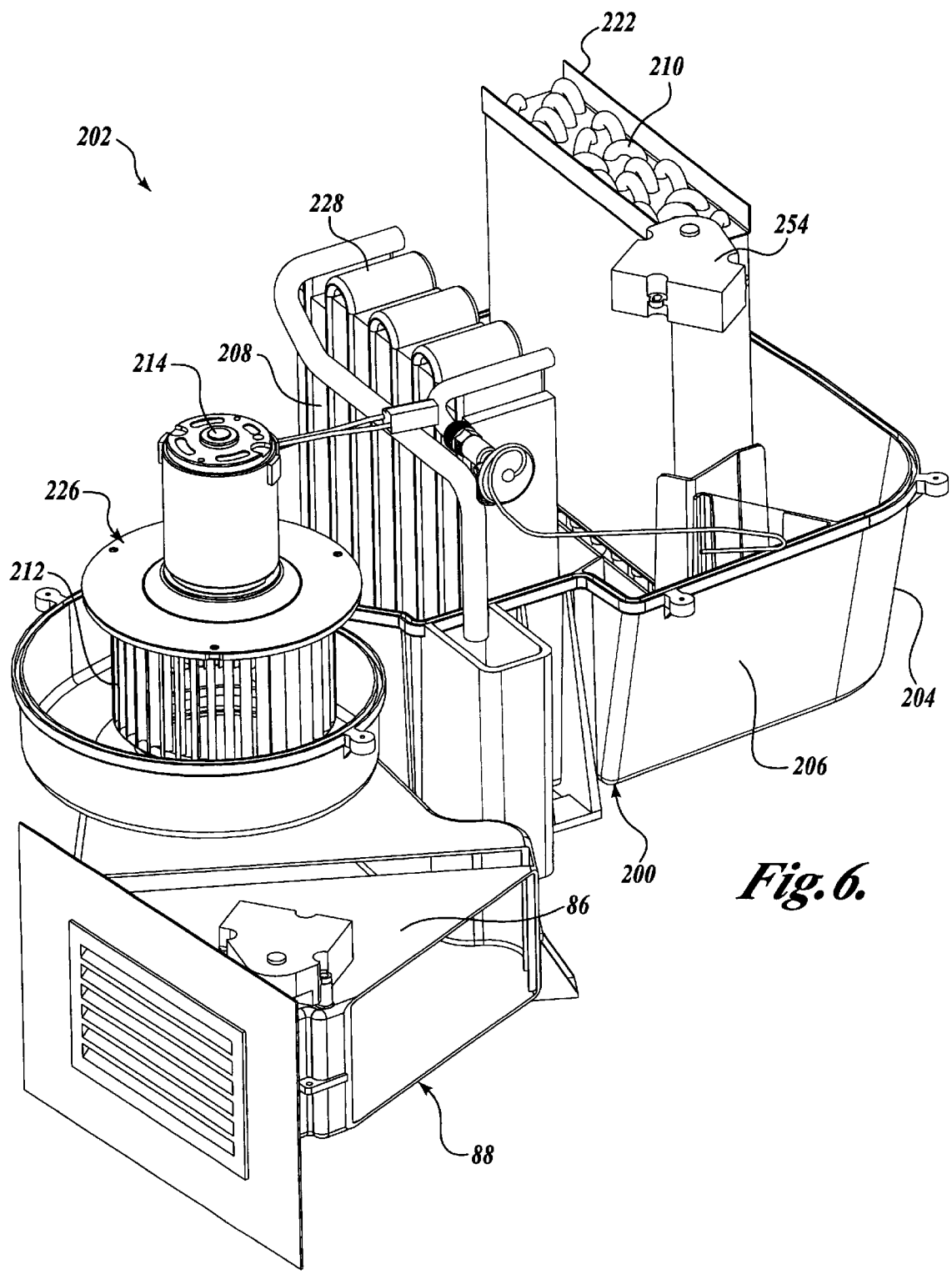
FIG. 6 is a perspective view of sleeper box air treatment system comprised of the fresh air intake plenum shown in FIG. 2 coupled to a heating, ventilation, and air conditioning unit.

Referring now to FIGS. 2 and 3, one embodiment of a sleeper box air intake plenum 88 will now be described in further detail. The air intake plenum 88 includes an enclosure 86 having a recirculated air inlet 68, a fresh air inlet 70, and an air outlet 52. The recirculated air inlet 68 is in fluid communication with the interior air of the sleeper box. The fresh air inlet 70 is in fluid communication with an aperture 98 in the peripheral wall 58 of the sleeper box, thereby configuring the air intake plenum 88 so as to be in fluid communication with fresh air 46 located outside of the sleeper box. Located on an opposing end of the air intake plenum 88 is the air outlet 52. The air outlet 52 is adaptable to be coupled to a HVAC unit 200, as shown in FIG. 6. The air outlet 52 may contain an annular seal or mating flange 72 to facilitate the coupling of the HVAC unit 200 to the air intake plenum 88.

An air filter slot 60 is disposed between the air inlets 68 and 70 and the air outlet 52. The air filter slot 60 allows the insertion of an air filter 64, providing a means to filter contaminates, such as particles, odors, bacteria, etc., from the air passing therethrough.

Positioned within the air intake plenum 88 is a door 74. The door 74 is pivotally connected to the air intake plenum 88 by a pivot shaft 80. Referring specifically to FIG. 3, the door 74 is pivotable between a closed position 78 and an open position 76. In the closed position 78, the door 74 substantially blocks the fresh air inlet 70, thereby substantially preventing the introduction of fresh air 46 into the air intake plenum 88. In the open position 76, the door 74 configures the air intake plenum 88 so that the fresh air inlet 70 and the recirculated air inlet 68 are in fluid communication with the air outlet 52. It will be appreciated by one skilled in the art, that although the door 74 is shown in the closed position 78 and the open position 76, the door may be positioned at any angle therebetween to selectively blend the ratio of fresh air 46 relative to recirculated air 82 to provide blended air 84 to the air outlet 52. Further, although in the illustrated embodiment the door 74, while in the closed position 76, is shown as not substantially sealing the recirculated air intake 68, it will be appreciated by one skilled in the art that the air intake plenum 88 may alternately be configured so that the door 74 may substantially seal the recirculated air inlet 68 of the air intake plenum 88.

An actuator 54 is coupled to the pivot shaft 80 upon which the door 74 is affixed. The actuator 54 is adapted to rotate the pivot shaft 80, thereby actuating the door 74 between the closed position 78 and the open position 76. The actuator 54 may be driven by an electrical signal initiated by a control switch operated by the user, or alternately, may be manually engaged and actuated by the user by well-known means, such as by a cable system. By adjusting the position of the door 74, the user may select a ratio of recirculated air 82 to fresh air 46, thereby providing blended air 84 to the air outlet 52.

The air intake plenum 88 further includes a drain 56 (not shown in FIG. 3, for clarity). The drain 56 is located in proximity to the fresh air inlet 70 and serves to allow the expulsion from the air intake plenum 88 of any moisture that may enter through the fresh air inlet 70. To aid in this function, the drain 56 is disposed within an inverted pyramid shaped tapered recess 102, configured to collect and direct any moisture present to the drain 56. Preferably, the drain 56 is piped to the outside environment. Additionally, the air intake plenum 88 includes a plurality of mounting brackets 66 to facilitate the mounting of the air intake plenum within the sleeper box 18.

Figure 4:
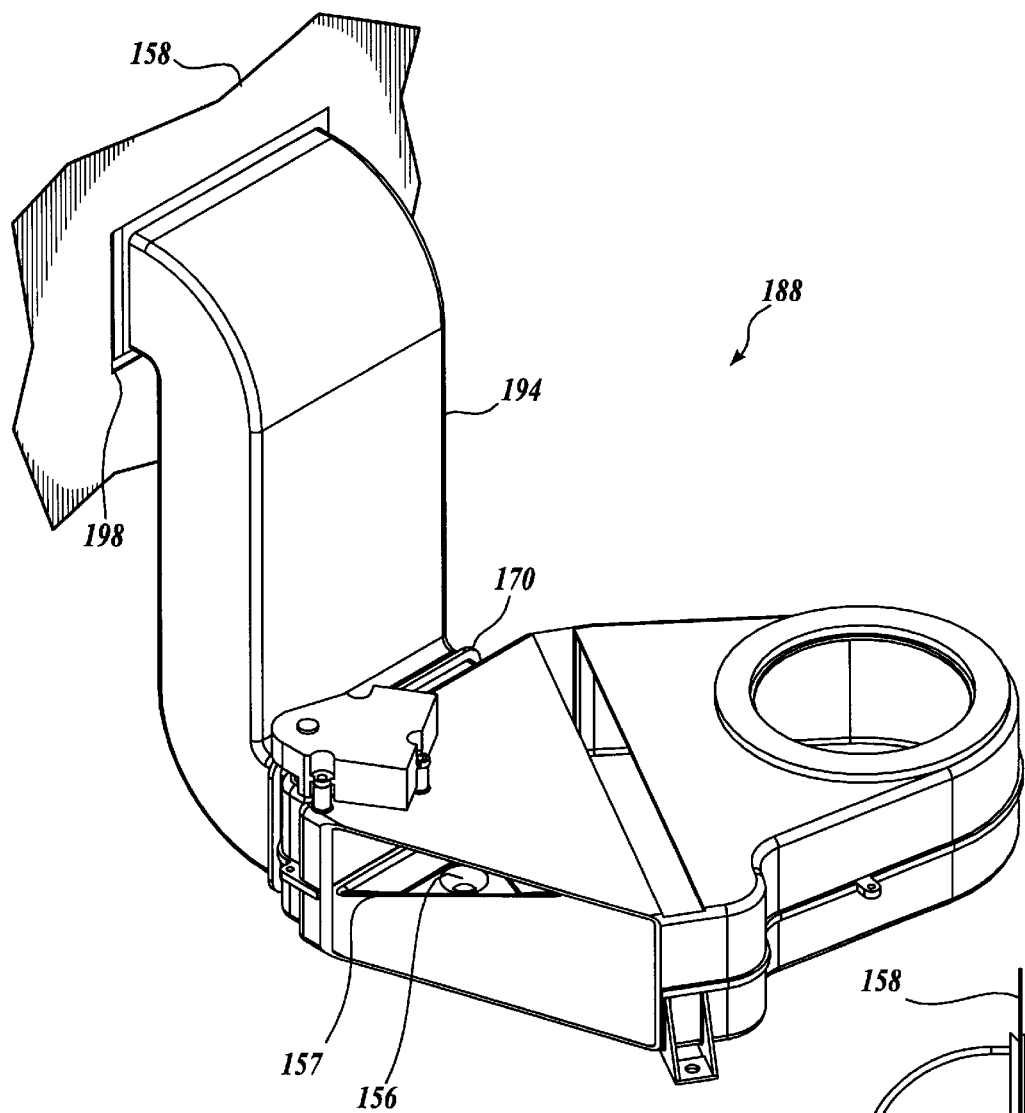
FIG. 4 is a perspective view of an alternate embodiment of a fresh air intake plenum of a sleeper box air treatment system, formed in accordance with the present invention.
Figure 5:
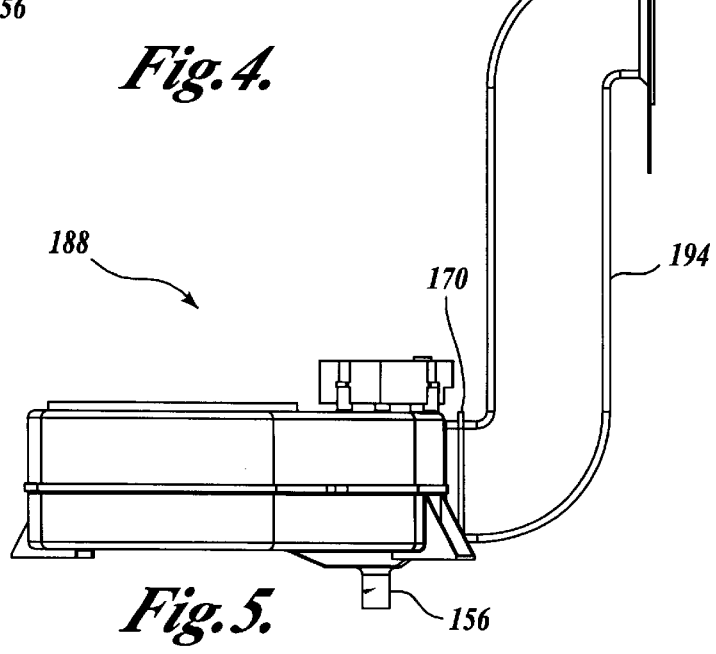
FIG. 5 is a side view of the fresh air intake plenum shown in FIG. 4.

Referring to FIGS. 4 and 5, an alternate embodiment of an air intake plenum 188 is shown. The air intake plenum 188 depicted in FIGS. 4 and 5 is substantially similar to the air intake plenum 88 depicted in FIGS. 2 and 3. Therefore, the disclosure for the air intake plenum 88 depicted in FIGS. 2 and 3 is hereby expressly incorporated by reference for the air intake plenum 188 depicted in FIGS. 3 and 4.

Although similar to the air intake plenum 88 of FIGS. 2 and 3, the air intake plenum 188 includes a section of ducting 194. The ducting 194 connects in fluid communication the air intake plenum 188 with an aperture 198 in a peripheral wall 158 of the sleeper box. The ducting 194 allows the coupling of the aperture 198 in fluid communication with a fresh air inlet 170 of the air intake plenum 188 when the aperture 198 is spaced from the air intake plenum 188.

The air intake plenum 188 further includes a drain 156. The drain 156 is located in proximity to the fresh air inlet 170 and serves to allow the expulsion from the air intake plenum 188 of any moisture that may enter through the fresh air inlet 170. To aid in this function, the drain 156 is disposed within an inverted pyramid shaped tapered recess 157, configured to collect and direct any moisture present to the drain 156. Preferably, the drain 156 is piped to the outside environment.

Referring to FIG. 6 in combination with FIGS. 2 and 3, the air intake plenum 88 depicted in FIGS. 2 and 3 may be coupled to a HVAC unit 200 to form a sleeper box air treatment system 202. The HVAC unit 200 includes a split enclosure 204 housing a heating heat exchanger 222, a cooling heat exchanger 228, and a blower 226. The split enclosure 204 serves as a plenum to contain air obtained by the blower 226 from the air intake plenum's 88 air outlet, directing the air through coils 208 of the cooling heat exchanger 228 and through coils 210 of the heating heat exchanger 222. The split enclosure 204 has an upper half (not shown in FIG. 6 for clarity) adapted to correspondingly mate with a lower half 206. The split enclosure 204 is adapted to couple to the enclosure 86 of the air intake plenum 88, placing the blower 226 in fluid communication with the air outlet of the air intake plenum 88.

The blower 226 includes a squirrel cage impeller 212 coupled to a driven shaft of a motor 214. The speed of the motor 214 is controlled by the user by well-known means. An actuator 254 driven blend door (not shown) is controlled by well-known means, where the blend door regulates the amount of air that passes across the heating heat exchanger 222 per the requested temperature setting. More specifically, all the air passes through the cooling heat exchanger 228. The blend door controls only the amount of air that passes through the heating heat exchanger 222 once already having passed through the cooling heat exchanger 228. It will be appreciated that conventional controls permit the user to selectively disengage the refrigeration cycle whereby the cooling heat exchanger 228 is not cooled.

To accomplish this, the blend door is disposed between the cooling and heating heat exchangers 222 and 228, where the blend door is actuatable between a first position wherein a substantial portion of the air impelled by the blower 226 is directed over the heating heat exchanger 222 and a second position wherein substantially none of the air impelled by the blower 226 is directed over the heating heat exchanger 222. Once the air passes through the heating heat exchanger 222, it is mixed with the air that has passed through the cooling heat exchanger 228 and by-passed the heating heat exchanger 222. Configured as described, the treated air may be dehumidified by first cooling the air to below the dew point, thereby precipitating out a portion of the water vapor contained in the air, and then heating a portion of the air to a higher temperature to provide occupant comfort as is well known in the art.

While the illustrated embodiment depicts both a heating and a cooling heat exchanger, one skilled in the art will appreciate that the sleeper box air treatment system 202 may include only one of the heat exchangers 222 or 228, or alternately, other air treatment devices in lieu of or additional to the heat exchangers 222 or 228, such as electrical resistance heating coils or filters, for example.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A sleeper box defining a volume, the sleeper box comprising:
    (a) an outer wall having an aperture therethrough;
    (b) an air plenum having a first air inlet fluidly connected to the aperture in the outer wall, a second air inlet disposed in the sleeper box volume and an air outlet disposed in the sleeper box volume;
    (c) a control door disposed in the air plenum, the control door being selectively movable between a first position wherein the control door substantially blocks the first air inlet and a second position wherein the control door does not substantially block the first air inlet;
    (d) a blower fluidly connected to the air plenum such that when the control door is in the second position the blower will cause air to flow into the air plenum through at least the first air inlet and out of the air plenum through the air outlet, whereby fresh air may be selectively provided into the sleeper box.

2. The sleeper box of claim 1, wherein the control door is attached to an actuator whereby the control door may be selectively positioned in a plurality of intermediate positions between the first and second positions whereby the proportion of air flowing into the plenum through the first and second air inlets may be adjusted.

3. The sleeper box of claim 1, further comprising an air filter disposed in the air plenum between the air outlet and the first and second air inlets such that substantially all of the air flowing into the air plenum through the air inlets will pass through the air filter before flowing out of the air plenum through the air outlet.

4. The sleeper box of claim 1, wherein the air plenum further comprises a bottom portion and a drain disposed in the bottom portion for draining liquid from the air plenum.

5. The sleeper box of claim 4, wherein the drain extends through an outer wall of the sleeper box.

6. The sleeper box of claim 1, wherein the first air inlet is connected to the aperture in the outer wall with a duct.

7. A method for providing intake air to a heating, ventilation, and air conditioning system of a sleeper box having an aperture in a peripheral wall of the sleeper box, the method comprising the steps of:
    (a) providing an aperture through the sleeper box peripheral wall;
    (b) obtaining fresh air through the aperture in the peripheral wall of a sleeper box and delivering the fresh air into an air plenum;
    (c) obtaining ambient air from within the sleeper box and delivering the ambient air into the air plenum;
    (d) selectively controlling the proportion of fresh air obtained relative to ambient air obtained; and
    (e) delivering the fresh and ambient air obtained to an air outlet adaptable to be coupled in fluid communication with a heating, ventilation, and air conditioning system.

8. The method of claim 7, further comprising the step of filtering the fresh air and the recirculated air.

9. An air treatment system of a sleeper box having an aperture in a peripheral wall of the sleeper box, the air treatment system comprising:
    (a) an enclosure having a fresh air inlet, a recirculated air inlet and an air outlet;
    (b) a blower disposed in the enclosure and adapted to draw air into the enclosure through the fresh air inlet and the recirculated air inlet;
    (c) a heat exchanger disposed in the enclosure, wherein the fresh air inlet extends through the aperture in the peripheral wall of the sleeper box, and the air drawn into the enclosure flows through the heat exchanger and out the air outlet;

a proportioner operable to adjust the ratio of fresh air relative to recirculated air drawn into the enclosure by the blower;

wherein the proportioner comprises a door actuatable between a first position, wherein the fresh air inlet is substantially open and the recirculated air inlet is substantially closed, and a second position, wherein the fresh air inlet is substantially closed and the recirculated air inlet is substantially opened.

10. The air treatment system of claim 9, further comprising an air filter disposed within the enclosure, disposed between the fresh air inlet and the air outlet wherein the air filter substantially divides the enclosure into two partitions.

11. The air treatment system of claim 9, further comprising at least one drain aperture penetrating a bottom wall of the enclosure.

\* \* \* \* \*

UNITED STATES PATENT AND TRADEMARK OFFICE
CERTIFICATE OF CORRECTION

PATENT NO. : 6,620,039 B1
DATED : September 16, 2003
INVENTOR(S) : M.J. Tao et al.

It is certified that error appears in the above-identified patent and that said Letters Patent is hereby corrected as shown below:

<u>Title page,</u>
Item [73], Assignee, "Paccar Inc.," should read -- PACCAR Inc, --
Item [57], ABSTRACT,
Line 1, "(88)of" should read -- (88) of --
Line 2, "(88)is" should read -- (88) is --

<u>Column 8,</u>
Line 67, "out the air outlet;" should read -- out the air outlet; and --

Signed and Sealed this

Thirteenth Day of January, 2004

JON W. DUDAS
*Acting Director of the United States Patent and Trademark Office*